United States Patent [19]

Bushman

[11] Patent Number: 4,470,344

[45] Date of Patent: Sep. 11, 1984

[54] CITRUS PEEL OIL EXTRACTOR

[75] Inventor: Ronald C. Bushman, Hacienda Heights, Calif.

[73] Assignee: Brown International Corporation, Covina, Calif.

[21] Appl. No.: 494,517

[22] Filed: May 13, 1983

[51] Int. Cl.³ .......................... A23N 1/00; B02C 15/00
[52] U.S. Cl. .......................................... 99/509; 99/536
[58] Field of Search ................... 99/488, 489, 495, 496, 99/509, 510, 516, 536, 501, 504; 198/782, 631, 425, 531; 83/866–868; 241/200, 277, 280

[56] References Cited

U.S. PATENT DOCUMENTS 2,354,878  8/1944  Platt .................................. 99/536 X
4,070,959  1/1978  Bushman et al. ..................... 99/510

Primary Examiner—Timothy F. Simone
Attorney, Agent, or Firm—Lyon & Lyon

[57] ABSTRACT

Peel oil is extracted from whole citrus fruit by means of a plurality of parallel horizontal toothed rolls. The toothed rolls define bights between them for reception and support of whole citrus fruit. Each roll comprises a shaft carrying a series of thin parallel rings each ring having a continuous series of pointed teeth on its periphery. A motor rotates the rolls in the same direction at different speeds. Water spray nozzles are spaced above the rolls to deliver relatively coarse sprays against the outer surface of each whole citrus fruit to carry away peel oil produced by the pointed teeth of the rings.

3 Claims, 10 Drawing Figures

CITRUS PEEL OIL EXTRACTOR

This invention relates to improvements over the device disclosed in the Bushman and Holbrook U.S. Pat. No. 4,070,959 granted Jan. 31, 1978.

In that patent, a plurality of parallel horizontal toothed rolls define bights or troughs between them for reception and support of whole citrus fruit. Each roll has a series of thin parallel rings with peripheral pointed teeth, the rings being mounted to turn with the supporting shaft. The toothed rolls are driven in the same direction at different speeds and the peel oil extracted from the whole fruit is received within a body of water which covers the pointed teeth of the rings. The peel oil is received immediately into the body of water and does not escape into the atmosphere. At any one time, all of the fruit in the machine is exposed to the same "community bath", so that bacteria from poor fruit may be transmitted to good fruit via the "bath".

The present invention employs some of the apparatus disclosed in that patent but relies upon overhead nozzles delivering relatively coarse water sprays against the outer surface of each fruit article supported on and in between the horizontal rolls. The direct spray action is much more coarse than a mist and carries the volatile peel oil at the time of extraction down through the bights or troughs between the toothed rolls and into a collecting pan. The level of liquid in the inclined collecting pan never reaches high enough to contact the toothed rolls. In this way, transmission of bacteria from poor fruit to good fruit via the bath is prevented.

The water and oil are later separated by centrifuge action.

Other and more detailed objects and advantages will appear hereinafter.

Figure 1:
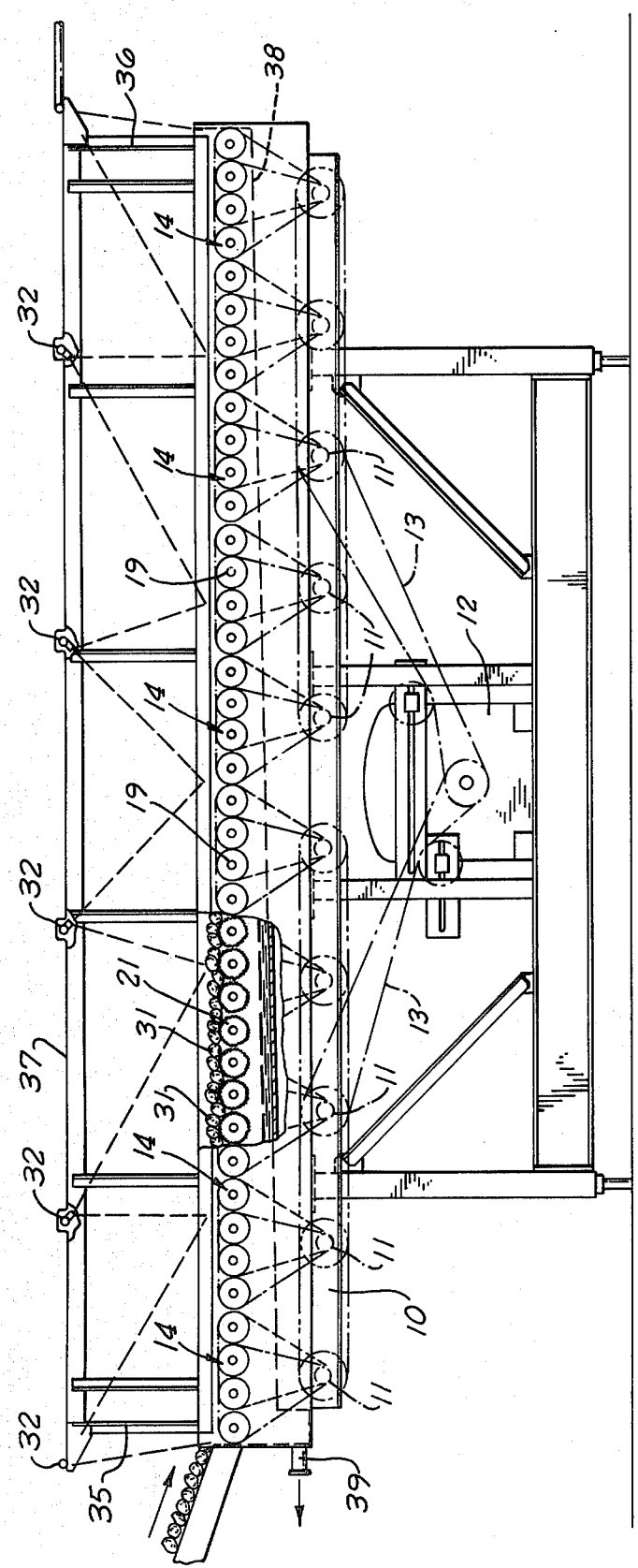
FIG. 1 is a schematic side elevation partly broken away, showing a preferred embodiment of this invention.
Figure 2:
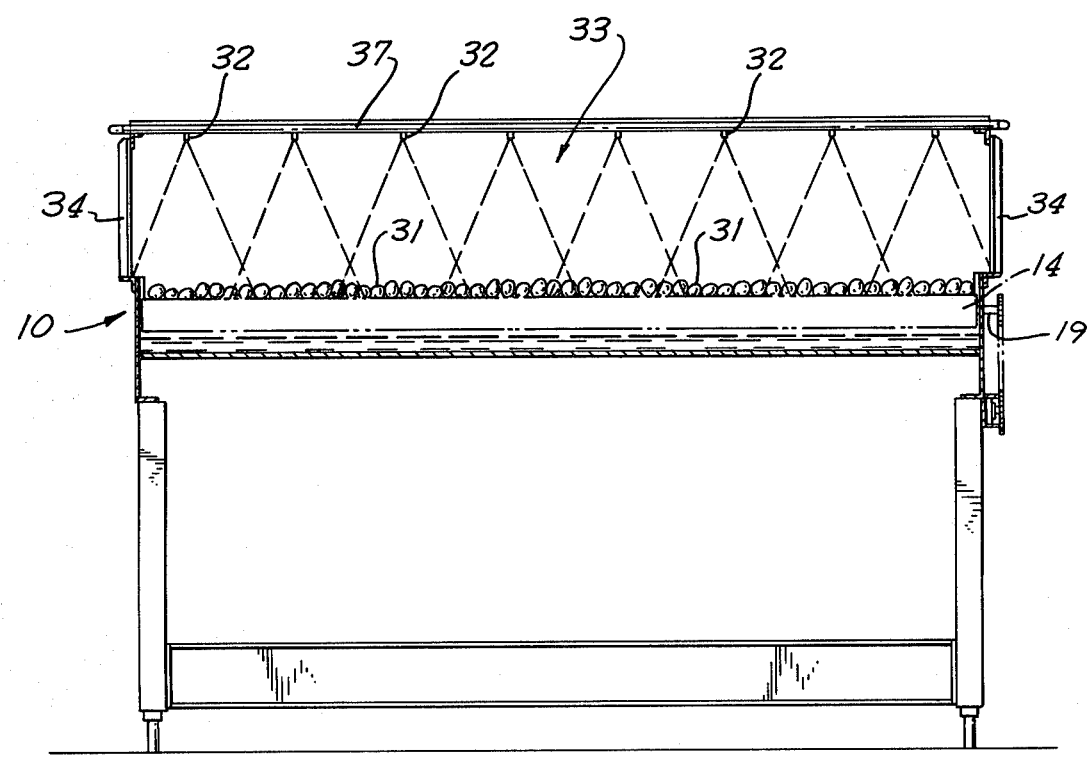
FIG. 2 is a schematic end elevation partly in section.
Figure 3:
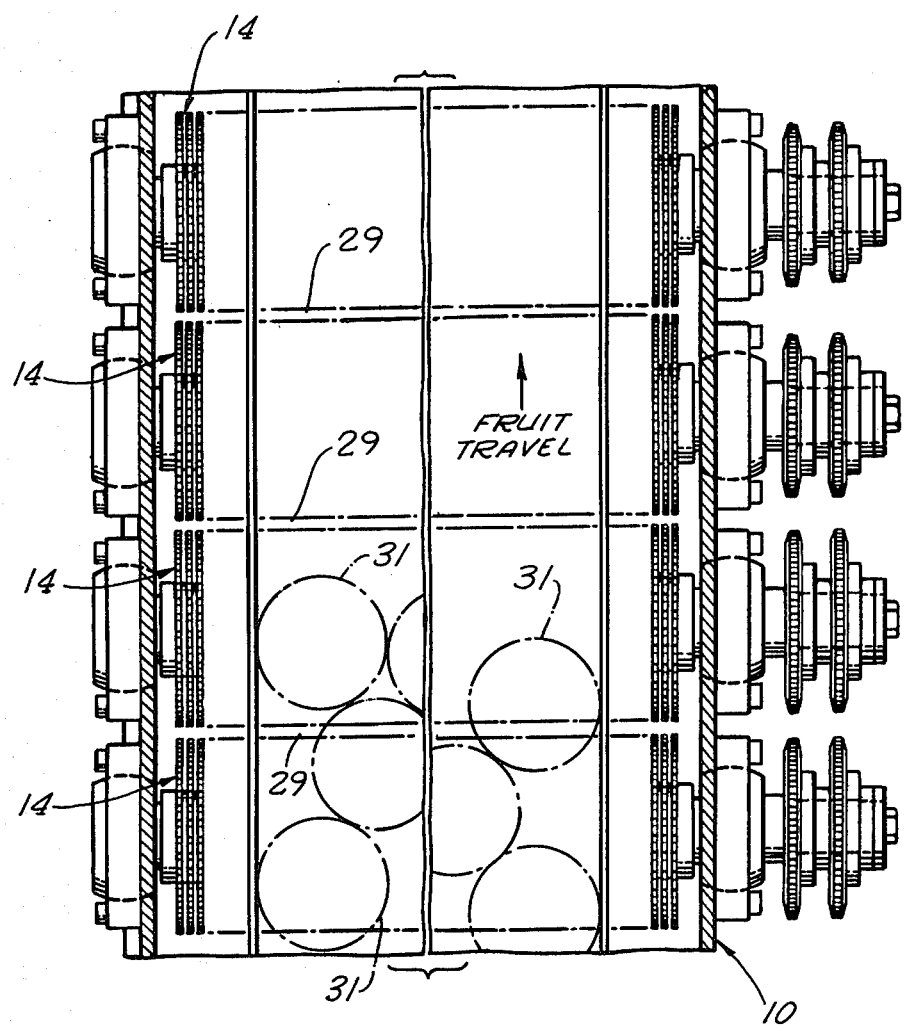
FIG. 3 is a plan view partly broken away and partly in section.
Figure 4:
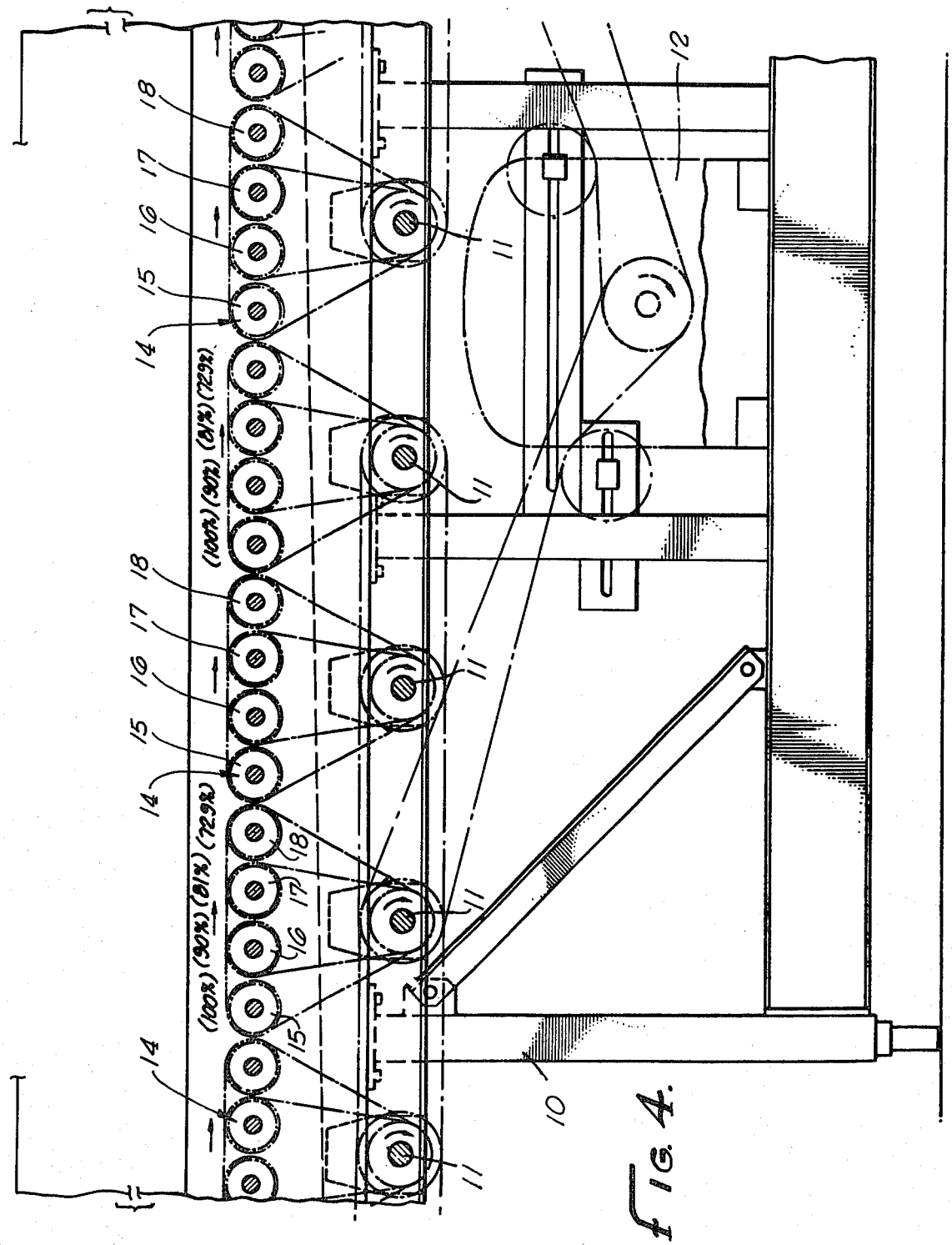
FIG. 4 is a side elevation partly broken away.
Figure 5:
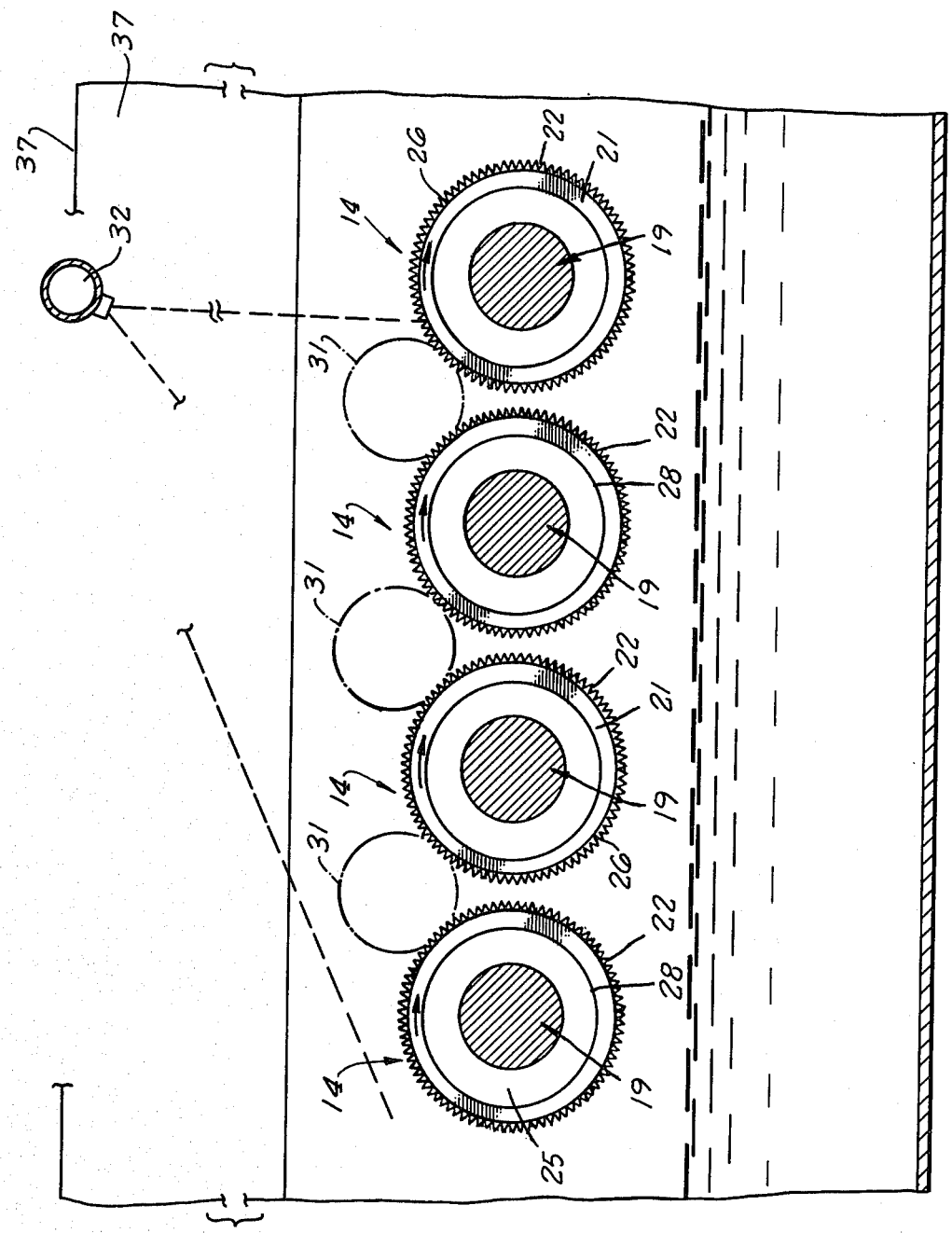
FIG. 5 is a sectional side elevation partly broken away.
Figure 6:
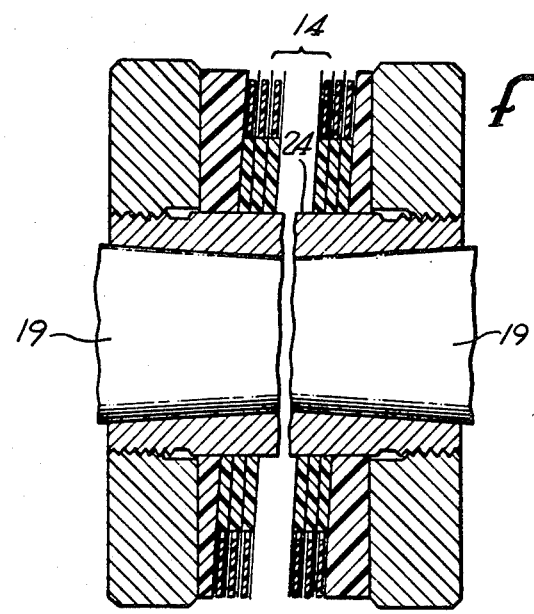
FIG. 6 is a sectional elevation showing details of the mounting of the toothed rings on the shaft.

Referring to the drawings, the stationary frame generally designated 10 supports a plurality of countershafts 11 all driven from the motor 12 by means of timing belts or chains 13. Mounted on the frame above the level of the countershaft 11 are a plurality of groups 14 of toothed roll assemblies. As best shown in FIG. 4 of the drawings, each group 14 of toothed roll assemblies contains four roll assemblies 15, 16, 17 and 18 which turn at decreasing speeds. Thus, assuming that the fast roll assemblies 15 turn at 100% speed, roll assemblies 16 turn at 90% of that speed, roll assemblies 17 turn at 81% of that speed, and the slow roll assemblies 18 turn at 72.9% of that speed. The slow roll assembly 18 in each group 14 is positioned adjacent the fast roll assembly 15 in the next group.

Figure 7:
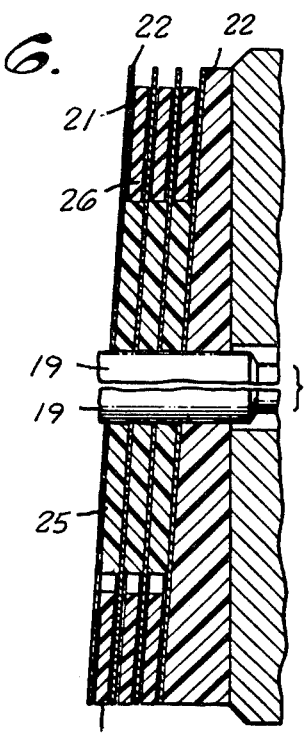
FIG. 7 is similar to FIG. 6, showing details of the parts on an enlarged scale.
Figure 8:
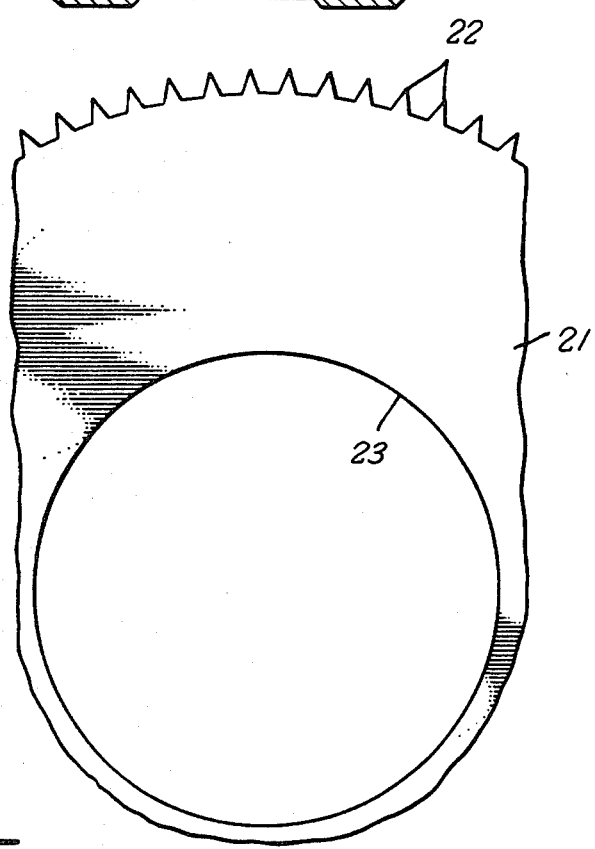
FIG. 8 shows a portion of one of the toothed rings on a still larger scale.
Figure 9:
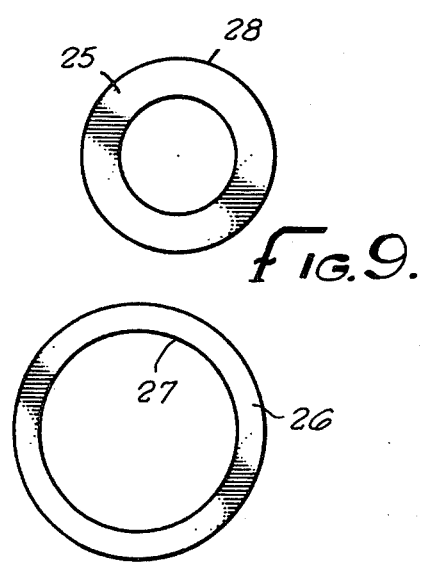
FIG. 9 shows one of the washer spacer disks employed between each pair of toothed rings.
Figure 10:
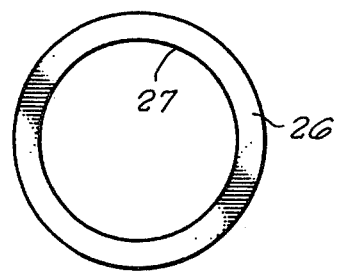
FIG. 10 shows one of the washers which encircles its corresponding disk.

As best shown in FIGS. 5–10, each toothed roll assembly is comprised of a roll shaft 19 encircled by a large number of very thin rings 21 each having sharp pointed teeth 22 on its outer periphery. The inner concentric circular opening 23 in each toothed ring 21 is large enough to receive the cylindrical portion of the roll shaft 19. As best shown in FIG. 7, spacer disks 25 are positioned between the toothed rings 21. A washer 26 encircles each of the spacer disks 25. The thickness of the washers 26 is slightly less than the thickness of the spacer disks, and the inside diameter 27 of the washers is greater than the outside diameter 28 of the spacer disks. Accordingly, the washers are free to move radially to a limited extent to prevent accumulation of unwanted materials between the toothed rings. The toothed rings 21 and washers 25 are clamped between the tapered blocks 41 and 42 and turn with the shaft 19.

Adjacent toothed roll assemblies form bights between them for reception of whole citrus fruit, for example, oranges, lemons, grapefruit, tangerines, generally designated 31 in the drawings. The sharp teeth 22 of the rings 21 puncture the outer surface of each article of fruit and thereby release the oil which is contained in the peel. The oil is very volatile and would escape into the atmospheric air. To prevent this unwanted result, spray heads 32 are mounted at spaced intervals above the level of the toothed rolls and within an enclosure 33 defined by the side walls 34, end walls 35 and 36, and the ceiling 37. The water sprays are relatively coarse and are directed against the outer surface of the fruit. The water carries peel oil liberated by the pointed rings down through the bights between adjacent toothed roll assemblies. An inclined pan 38 receives the oil-carrying spray water and returns it by gravity to the discharge fitting 39. The liquid level in the pan 38 does not build up high enough to reach the underside of the toothed roll assemblies. The oil-containing water is later centrifuged to separate the peel oil from the water.

Having fully described my invention, it is to be understood that I am not to be limited to the details herein set forth but that my invention is of the full scope of the appended claims.

I claim:

1. Apparatus for extracting oil from the peel of whole citrus fruit comprising, in combination: a plurality of parallel horizontal rolls defining bights between them for reception and support of whole citrus fruit, each roll having a series of thin parallel rings, each ring having a continuous series of pointed teeth on its periphery, spacer disks interposed between each adjacent pair of rings, power means for rotating said rolls in the same direction at different speeds, walls defining an enclosure above the level of the horizontal rolls, spray nozzles spaced within the enclosure to deliver liquid sprays directly against the outer surface of each whole citrus fruit to carry away peel oil produced by the pointed teeth of said rings, and means below the rolls for receiving the spray liquid and peel oil.

2. Apparatus for extracting oil from the peel of whole citrus fruit comprising, in combination: a plurality of parallel horizontal rolls defining bights between them for reception and support of whole citrus fruit, each roll having a series of thin parallel rings, each ring having a continuous series of pointed teeth on its periphery, spacer disks interposed between each adjacent pair of rings, power means for rotating said rolls in the same direction at different speeds, walls defining an enclosure above the level of the horizontal rolls, spray nozzles spaced within the enclosure to deliver water sprays directly against the outer surface of each whole citrus fruit to carry away peel oil produced by the pointed teeth of said rings, a pan positioned below the rolls for receiving the spray water and peel oil, and discharge means on said pan to prevent the level of liquid in the pan from rising to the level of said toothed rings.

3. Apparatus for extracting peel oil from whole citrus fruit comprising, in combination: a plurality of parallel horizontal rolls defining bights between them for reception and support of whole citrus fruit, each roll comprising a shaft carrying a series of thin parallel rings, each ring having a continuous series of pointed teeth on its periphery, power means for rotating said rolls in the same direction at different speeds, spray nozzles spaced above the rolls to deliver liquid sprays directly against the outer surface of each whole citrus fruit to carry away peel oil produced by the pointed teeth of said rings, and means below the rolls for receiving the spray liquid and peel oil.

* * * * *